June 19, 1923.                M. F. JUDD                1,459,470

TRANSMISSION AND BRAKE MECHANISM

Filed Dec. 1, 1921

INVENTOR.
Morton F. Judd.
BY Wooster & Davis
ATTORNEYS.

Patented June 19, 1923.

1,459,470

UNITED STATES PATENT OFFICE.

MORTON F. JUDD, OF STRATFORD, CONNECTICUT, ASSIGNOR TO THE RAYBESTOS COMPANY, OF BRIDGEPORT, CONNECTICUT, A CORPORATION OF CONNECTICUT.

TRANSMISSION AND BRAKE MECHANISM.

Application filed December 1, 1921. Serial No. 519,085.

*To all whom it may concern:*

Be it known that I, MORTON F. JUDD, a citizen of the United States, residing at Stratford, county of Fairfield, State of Connecticut, have invented an Improvement in Transmission and Brake Mechanism, of which the following is a specification.

This invention relates to transmission and brake mechanisms and particularly such mechanisms, where there are two or more drums having entirely different functions and, therefore, operate under entirely different conditions.

Hitherto, it has been the practice to use for transmission and brake linings to be applied to transmissions of this type, linings of the same composition and character for all three of the transmission drums. As the linings on these drums are subjected to entirely different effects as to abrasion, vibration and temperature, it will be apparent that a lining which is of the right composition and character for the conditions met with on one drum, will not be at all satisfactory when used on another drum where the conditions of operation are entirely different; and where the same lining is used for all three drums, one of them may operate satisfactorily while the others will not.

It is, therefore, an object of my invention to provide a transmission of the character mentioned in which all the drums will operate equally well, that is, in which there will be uniform operation.

It is a further object of the invention to provide a transmission of this type in which the linings for the separate drums are of such composition and character as to best meet the conditions of operation of the particular drums, and the different effects as to abrasion, vibration and temperature.

With these and other objects in view I have devised the structure illustrated in the accompanying drawing, in which—

Figure 1:
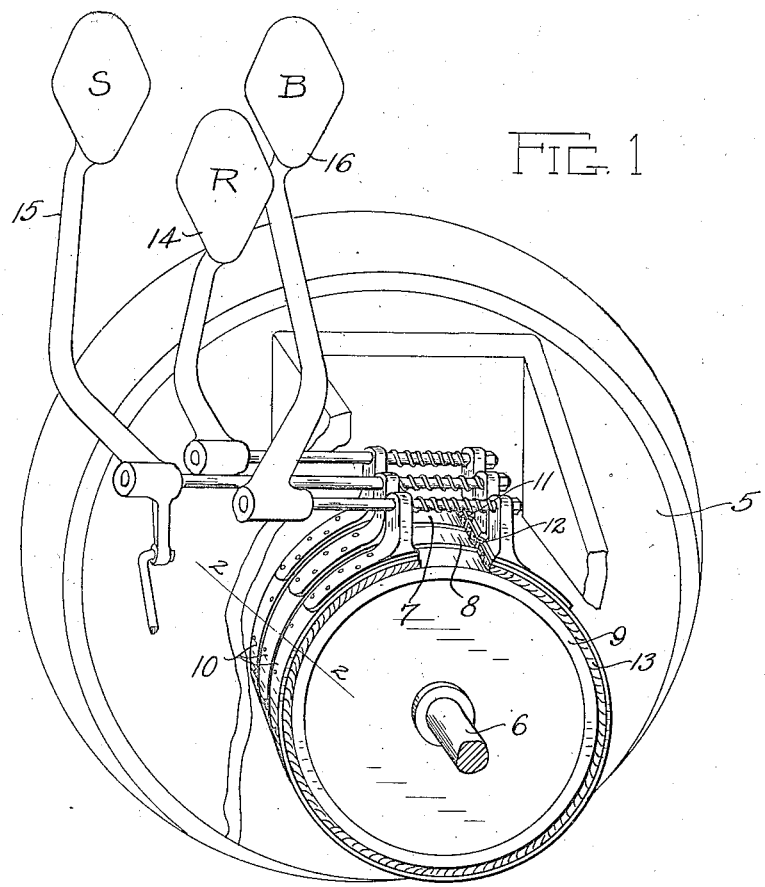
Figure 2:
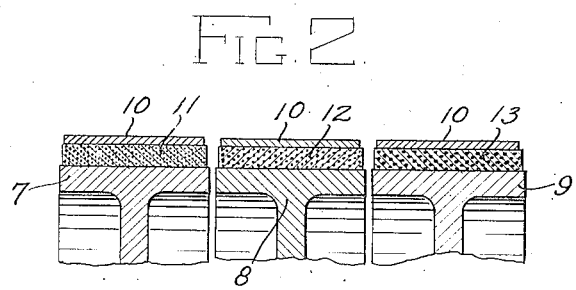

Fig. 1 is a perspective view indicating the three drums of a transmission and brake mechanism of the type employed on a Ford car showing the application of my invention, and Fig. 2 is a transverse section through the rims of the drums, the bands and the lining therefor, substantially on the line 2—2 of Fig. 1.

Reference numeral 5 represents the outline of the transmission casing in which is the power transmitting shaft 6 extending through the drums 7, 8 and 9, the ordinary arrangement in transmissions of this type being, drum 7 the reverse drum, drum 8 the slow speed drum, and drum 9 the brake drum. Each drum is surrounded by a metal band 10 with linings 11, 12 and 13 between the bands and the respective drums 7, 8 and 9. In operation, the bands are clamped about the various drums, as desired, by suitable means, such as the pedals 14, 15 and 16 for the reverse, slow speed and brake bands, respectively, the mechanism being so arranged, as is well known, that pressing on any given pedal will clamp its particular band about the corresponding drum, the specific clamping mechanism not being shown as it constitutes no part in my invention.

In operation, the function of the band on the reverse drum 7 is to check the rotation thereof and hold the drum to engage the reverse gear mechanism. There is very little slipping between this drum and the lining for the reason that the action of the lining is almost entirely a holding one. Therefore, the lining of this drum is designed to resist compression and consists preferably of a cotton fabric of a very hard and compact weave which obviates the necessity of frequent adjustment. As there is little or no slipping on this drum, a heat resisting material is not required.

The slow speed drum 8 has more slipping with respect to the lining than does the reverse drum and it, therefore, requires a lining for the band proper capable of resisting the heat generated from the necessary slipping when the lining engages this drum to secure an easy and gradual acceleration. It has been found in practice that a lining composed of a mixture of asbestos and cotton meets these requirements and for transmissions of this type, a lining composed approximately of 50% asbestos and 50% cotton meets all the requirements most satisfactorily. This lining requires a saturant binder which will not harden or glaze under the heat generated in its application.

The brake drum band receives the severest use in operation and in all applications of this band, unless the wheels are locked, there is a slipping relative to the drum. The lining for this band is required to be of a heat resisting material of a slightly compressible nature but which is able to recover, after compression, to such a degree as to make frequent adjustment unnecessary and is, therefore, preferably composed of asbestos yarn and a suitable saturant binder, which binder must be of such a nature as not to harden or permit glazing. When the brake is applied, provided the wheels do not skid, all the momentum of the vehicle must be absorbed between the drum and the lining. Therefore, a very high temperature may be produced in a very short time and any material of an organic nature would be destroyed. If a hard and unyielding lining is used on such a brake drum, small inequalities or eccentricities in this drum, or its bearings, cause vibrations to be imparted to the vehicle which are described as chatter. A softer and more yielding lining, when applied to this drum, tends to absorb these vibrations to a satisfactory degree and to overcome this tendency to chatter.

In view of the foregoing, it will be apparent that in transmission and brake mechanism employing a plurality of drums, which drums operate under different conditions and, therefore, have different effects as to abrasion, vibration and temperature, the application of linings of such a character and composition as to meet the requirements of the respective drums, will give a much smoother, more efficient, and more satisfactory operation, and will prolong the life of the transmission and brake mechanism and require less adjustment and attention than could possibly be the case where the linings are the same for all the drums.

Having thus set forth the nature of my invention, what I claim is:

1. A power transmission device comprising a plurality of rotatable drums, bands for the respective drums, and linings for the bands adapted to engage the drums, in which in operation one drum has very little slippage with respect to the band, a second drum has more slippage with respect to the band, and a third drum in which the action is practically all slippage, the lining for the first drum being largely composed of cotton, the lining for the second drum being composed of a mixture of cotton and asbestos, and the lining for the third drum is largely composed of asbestos.

2. A power transmission and brake mechanism for automobiles comprising three drums, one each for the reverse, low speed and brake, bands for the respective drums, and linings for the respective bands adapted to engage the drums, the lining for the reverse drum being adapted to resist compression and consisting of a fabric of very hard and compact weave, the lining for the low speed drum being composed of asbestos and cotton treated with a saturant binder, and the lining for the brake drum being mainly composed of a heat resisting fibre material of a slightly compressible nature treated with a saturant binder.

In testimony whereof I affix my signature.

MORTON F. JUDD.